UNITED STATES PATENT OFFICE.

CHRISTOPHER RIS AND ALBERT MYLIUS, OF BASLE, SWITZERLAND, ASSIGNORS TO ANILIN COLOR AND EXTRACT WORKS, FORMERLY JOHN R. GEIGY, OF BASLE, SWITZERLAND.

YELLOW SULFUR DYE AND PROCESS OF MAKING SAME.

SPECIFICATION forming part of Letters Patent No. 722,630, dated March 10, 1903.

Application filed November 25, 1902. Serial No. 132,748. (Specimens.)

*To all whom it may concern:*

Be it known that we, CHRISTOPHER RIS and ALBERT MYLIUS, citizens of Switzerland, and residents of Basle, Switzerland, have invented certain new and useful Improvements in Yellow Sulfur Dyes and Processes of Making the Same, of which the following is a specification.

The present invention relates to the production of new yellow sulfur dyestuffs, which may be obtained by melting the formylated derivates of metatoluylenediamin with sulfur, to which melt there may be added some other substances, especially benzidin and its derivates or metatoluylenediamin. Both monoformyl-metatoluylenediamin and diformyl-metatoluylenediamin can be used to perform the reaction. These formyl derivates are to be obtained by boiling the said base with formic acid for several hours in a reflux apparatus. When crystallized from boiling water, the monoformyl-metatoluylenediamin forms transparent pyramids of the melting-point of 113° to 114° centigrade, while diformyl-metatoluylenediamin is obtained in white needles, melting at 176° to 177° centigrade.

The following examples may be given to explain the method of carrying out the invention.

First example: Sixty kilos of monoformyl-metatoluylenediamin and one hundred kilos of sulfur are melted together in an iron vessel with stirring mechanism, then heated to about 200° to 220° centigrade till the development of sulfureted hydrogen will almost be finished—that is to say, for instance, for about five to six hours. The melt is left to cool and then finely pulverized. It forms a light-brown powder, which dissolves easily in hot diluted caustic-soda lye or sodium-sulfid solution with a yellow color. From the latter it dyes unmordanted cotton golden-yellow shades. The color is insoluble in alcohol, ether, and benzene. Concentrated sulfuric acid gives a yellowish milky liquor.

Second example: Thirty kilos of diformylated metatoluylenediamin, thirty kilos of benzidin, and one hundred and twenty kilos of sulfur are melted together as described in the first example. This color shows the same reaction as the formerly described, but a more greenish shade of yellow. If only half the quantity of benzidin is used, a coloring-matter of a little redder shade is obtained. Instead of benzidin there may be used some of its derivates, such as thiobenzidin, diformylated, and diacetylated benzidin.

Third example: Thirty kilos of diformylated metatoluylenediamin, twenty kilos of metatoluylenediamin, and one hundred and twenty kilos of sulfur are melted together as above described. The thus-obtained color shows the same properties as that of the first example, except a somewhat-redder shade of yellow, turning to orange.

In these examples the relative quantities used and also the temperature may be varied within some limits, as it is generally the case.

Having thus described our invention, what we claim as new, and desire to secure by Letters Patent, is—

1. The process of producing yellow sulfur dyestuffs by melting formylated derivates of metatoluylenediamin with sulfur and benzidin, substantially as described.

2. As new products the thus-obtained yellow sulfur dyestuffs, which form light-brown powders, soluble in hot diluted caustic-soda lye or sodium-sulfid solution, with yellow color insoluble in alcohol, ether and benzene, giving with concentrated sulfuric acid yellowish milky liquors, and which dye unmordanted cotton yellow shades from a bath containing sodium sulfid, substantially as described.

In testimony whereof we have signed our names to this specification in the presence of two subscribing witnesses.

CHRISTOPHER RIS.
ALBERT MYLIUS.

Witnesses:
GEO. GIFFORD,
ALBERT VICTOR GRAETER.